US007373586B2

United States Patent
Abe et al.

(10) Patent No.: US 7,373,586 B2
(45) Date of Patent: May 13, 2008

(54) DIFFERENCING AND MERGING TREE-STRUCTURED DOCUMENTS

(75) Inventors: Mari Abe, Yokohama (JP); Hideki Tai, Yokohama (JP); Takashi Nerome, Yokohama (JP); Kouichi Ono, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 10/934,232

(22) Filed: Sep. 3, 2004

(65) Prior Publication Data

US 2006/0053366 A1    Mar. 9, 2006

(51) Int. Cl.
*G06F 17/00* (2006.01)
(52) U.S. Cl. ............ 715/200; 715/234; 715/255
(58) Field of Classification Search ............ 715/500, 715/513, 530, 514–515; 707/203
See application file for complete search history.

(56) References Cited

U.S. PATENT DOCUMENTS

| 5,243,607 | A  | * | 9/1993  | Masson et al. ............ 714/49  |
| 6,526,410 | B1 | * | 2/2003  | Aoyama et al. ........... 707/102 |
| 6,567,803 | B1 | * | 5/2003  | Ramasamy et al. ......... 707/4   |
| 2002/0188613 | A1 | * | 12/2002 | Chakraborty et al. ..... 707/100 |
| 2003/0093755 | A1 | * | 5/2003  | O'Carroll ................. 715/500 |
| 2003/0145278 | A1 | * | 7/2003  | Nielsen ................... 715/511 |
| 2004/0267779 | A1 | * | 12/2004 | Carter et al. ............. 707/100 |

OTHER PUBLICATIONS

Wuu Wang, "Identifying Syntactic Differences Between Two Programs", pp. 739-755, copyright 1991.*

Yuan Wang et al., "X-Diff: An Effective Change Detection Algorithm for XML Documents," 19th International Conference on Data Engineering, Mar. 5-8, 2003, Bangalore, India, pp. 519 et seq.

Latifur Khan et al., "Change Detection of XML Documents Using Signatures," WWW2002 Workshop on Real World RDF and Semantic Web Applications, in conjunction with the 2002 International WWW Conference, May 7, 2002, Honolulu, Hawaii.

Introduction to DeltaXML, http://www.DeltaXML.com, Nov. 26, 2001 through Dec. 29, 2003.

XML Diff and Merge Tool, http://www.alphaworks.ibm.com, Jan. 15, 1999.

(Continued)

*Primary Examiner*—Thu Huynh
(74) *Attorney, Agent, or Firm*—Vazken Alexanian

(57) ABSTRACT

Differencing and merging tree-structured documents, such as extensible Markup Language (XML) documents, is disclosed. A differencing-and-merging system for tree-structured documents of one embodiment of the invention includes a difference processing unit and a merging processing unit. The differencing processing unit performs a difference operation on at least two tree-structured documents, in accordance with difference configuration information regarding the documents. The merging processing unit performs a merging operation on the tree-structured documents from correspondence information generated by the difference processing unit, based on the difference operation configuration information regarding the documents. The correspondence information indicates differences among nodes of the documents. The difference operation configuration information specifies one or more nodes among the documents that are to be considered equivalent when the difference operation is performed, and one or more nodes among the documents that are to be ignored when the difference operation is performed.

4 Claims, 15 Drawing Sheets

OTHER PUBLICATIONS

David Geary, "A First Look at JavaServer Faces," Parts 1 & 2, http://www.javaworld.com, Nov. 29, 2002 (Part 1) and Dec. 27, 2002 (Part 2).

Tancred Lindholm, "A 3-way Merging Algorithm for Synchronizing Ordered Trees—the 3DM merging and differencing tool for XML," Master's Thesis, Helsinki University of Technology, Dept. of Computer Science, Sept. 2001.

U.S. Appl. No. 10/864,046, filed Jun. 7, 2004.

Hideki Tai et al., Model-Driven Development of Dynamic Web Applications, Proceedings of Extreme Markup Languages 2002, Montreal, Quebec, Aug. 6-9, 2002.

* cited by examiner

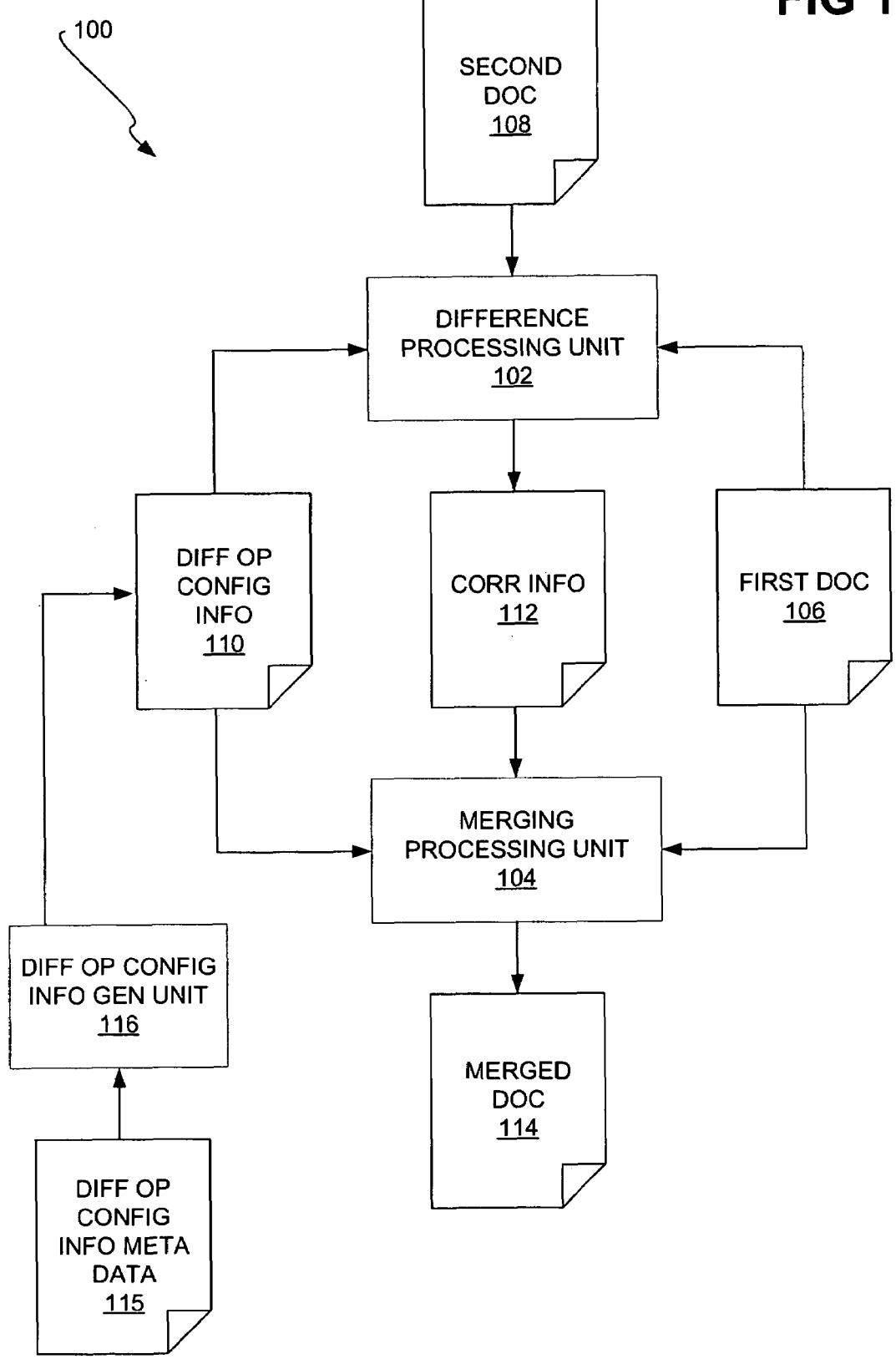

```
<?xml version="1.0"?>
<CATALOG>
     <CD>
          <TITLE>Collection of Country Songs</TITLE>
          <ARTIST>James Smith</ARTIST>
     </CD>
     <CD>
          <TITLE>Collection of Dance Songs</TITLE>
          <ARTIST>Frank Jones</ARTIST>
     </CD>
     <CD>
          <TITLE>Rock Anthology</TITLE>
          <ARTIST>Band of Friends</ARTIST>
     </CD>
</CATALOG>
```

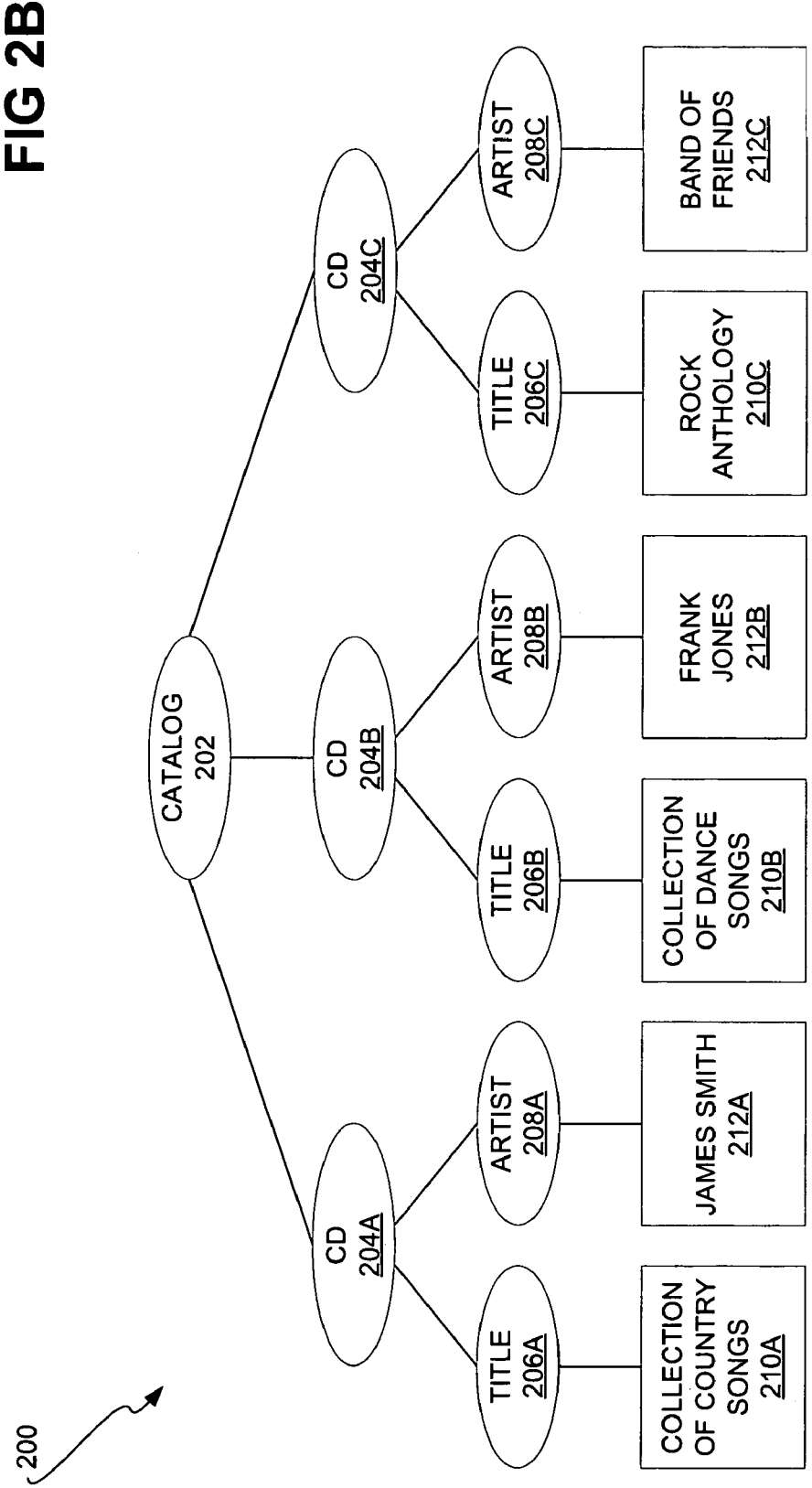

```
<?xml version="1.0"?>
<CATALOG>
      <CD>
            <NAME>Collection of Country Songs</NAME>
            <ARTIST>James Smith</ARTIST>
      </CD>
      <CD>
            <NAME>Collection of Vocal Songs</NAME>
            <ARTIST>Ann Taylor</ARTIST>
      </CD>
      <CD>
            <NAME>Rock Anthology</NAME>
            <ARTIST>Friends</ARTIST>
      </CD>
</CATALOG>
```

FIG 4A

```
<?xml version="1.0"?>
<EQUIVALENT>
    <NODE>
        <1>TITLE</1>
        <2>NAME</2>
    </NODE>
</EQUIVALENT>
<IGNORABLE>
    <NODE>
        <1>ARTIST</1>
    </NODE>
</IGNORABLE>
```
400

FIG 4B

```
<?xml version="1.0"?>
<ONLY-IN-FIRST>
    <CD>
        <TITLE>Collection of Dance Songs</TITLE>
        <ARTIST>Frank Jones</ARTIST>
    </CD>
</ONLY-IN-FIRST>
<ONLY-IN-SECOND>
    <CD>
        <NAME>Collection of Vocal Songs</NAME>
        <ARTIST>Ann Taylor</ARTIST>
    </CD>
</ONLY-IN-SECOND>
```
450

```
<?xml version="1.0"?>
<CATALOG>
    <CD>
        <TITLE>Collection of Country Songs</TITLE>
        <ARTIST>James Smith</ARTIST>
    </CD>
    <CD>
        <TITLE>Collection of Dance Songs</TITLE>
        <ARITST>Frank Jones</ARTIST>
    </CD>
    <CD>
        <TITLE>Rock Anthology</TITLE>
        <ARTIST>Band of Friends</ARTIST>
    </CD>
    <CD>
        <TITLE>Collection of Vocal Songs</TITLE>
        <ARTIST>Ann Taylor</ARTIST>
    </CD>
</CATALOG>
```

```
<?xml version="1.0"?>
<CATALOG>
    <CD>
        <NAME>Collection of Country Songs</NAME>
        <ARTIST>James Smith</ARTIST>
    </CD>
    <CD>
        <NAME>Collection of Vocal Songs</NAME>
        <ARTIST>Ann Taylor</ARTIST>
    </CD>
    <CD>
        <NAME>Rock Anthology</NAME>
        <ARTIST> Friends</ARTIST>
    </CD>
    <CD>
        <NAME>Collection of Dance Songs</NAME>
        <ARTIST>Frank Jones</ARTIST>
    </CD>
</CATALOG>
```

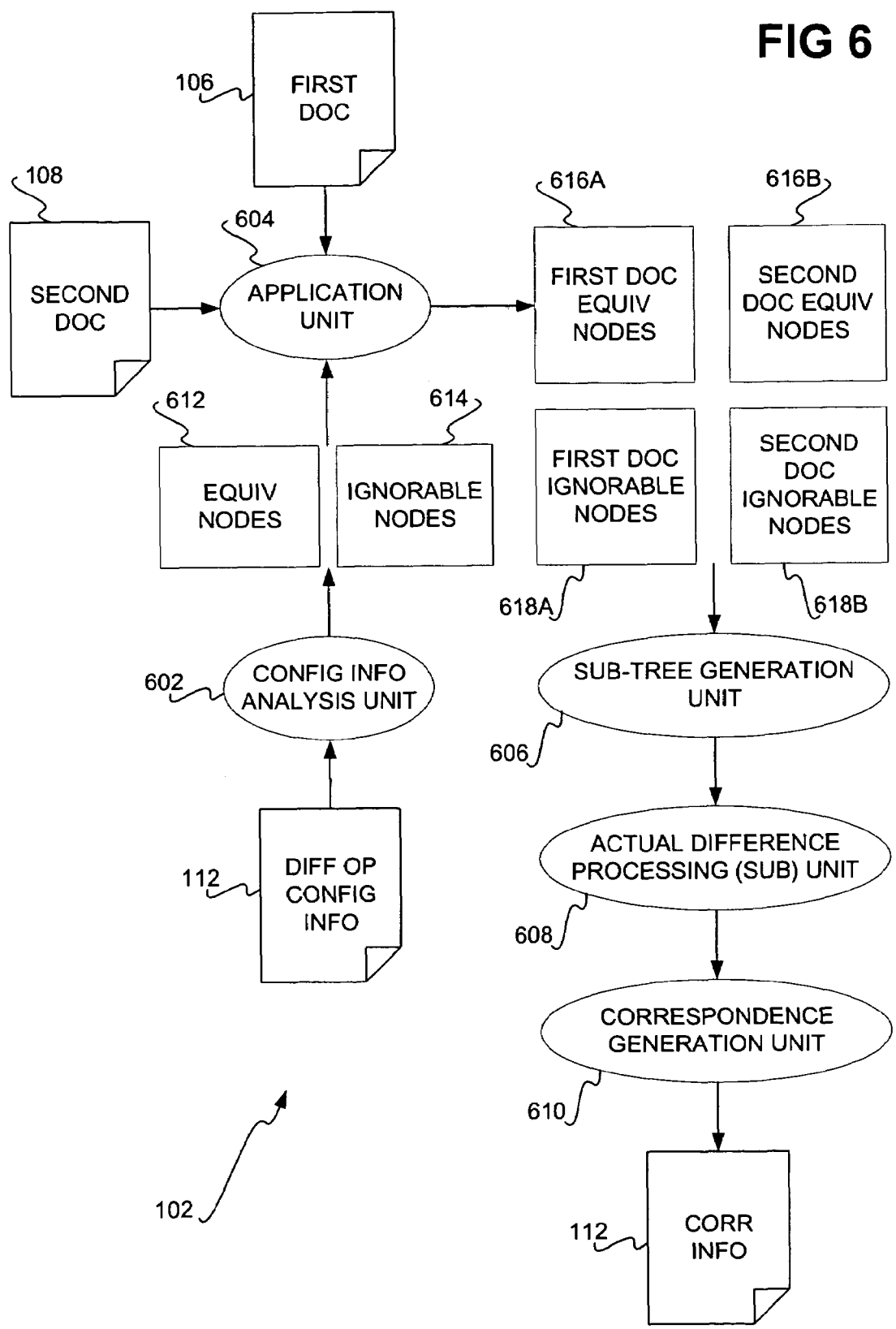

FIG 9

```
<?xml version="1.0?>
<CATALOG id="1">
       <CD id="2">
              <TITLE id="3">Collection of Country Songs</TITLE>
              <ARTIST id="5">James Smith</ARTIST>
       </CD>
       <CD id="7">
              <TITLE id="8">Collection of Dance Songs</TITLE>
              <ARTIST id="10">Frank Jones</ARTIST>
       </CD>
       <CD id="12">
              <TITLE id="13">Rock Anthology</TITLE>
              <ARTIST id="15">Band of Friends</ARTIST>
       </CD>
</CATALOG>
```
⌐900

FIG 10

```
<?xml version="1.0"?>
<EQUIVALENT>
    <RULE>"CD contains TEXT" and "TEXT patternOf VALUE"</RULE>
</EQUIVALENT>
<IGNORABLE>
    <RULE>"TEXT containedBy ARTIST" and "ARTIST containedBy CD"</RULE>
    <RULE>"TITLE containedBy CD"</RULE>
</IGNORABLE>
```

```
<?xml version="1.0"?>
<EQUIVALENT>
    <XPATH>//CD[descendant::text()[string(.)='Collection of Country Songs']]
    </XPATH>
    <XPATH>//CD[descendant::text()[string(.)='Collection of Dance Songs']]
    </XPATH>
    <XPATH>//CD[descendant::text()[string(.)='Rock Anthology']]
    </XPATH>
</EQUIVALENT>
<IGNORABLE>
    <XPATH>//text()[parent::ARTIST[parent::CD]]</XPATH>
    <XPATH>//TITLE[parent::CD]</XPATH>
</IGNORABLE>
```

```
<?xml version="1.0?>
<Diff>
        <node id="1" op="keep"/>
        <node id="2" op="keep"/>
        <node id="3" op="replace">
                NAME
        </node>
        ...
        <node id="7" op="delete"/>
        <node id="2" op="insert">
                <CD>
                        <NAME>Collection of Vocal Songs</NAME>
                        <ARTIST>Ann Taylor </ARTISTS>
                </CD>
        </node>
        ...
        <node id="15" op="keep"/>
        <node id="16" op="replace">
                Friends
        </node>
</Diff>
```

FIG 13

```
                    ⌐1300
<?xml version="1.0?>
<CATALOG>
    <CD>
        <NAME>Collection of Country Songs</NAME>
        <ARTIST>James Smith</ARTIST>
    </CD>
    <CD>
        <NAME>Collection of Dance Songs</NAME>
        <ARTIST>Frank Jones</ARTIST>
    </CD>
     <CD>
        <NAME>Collection of Vocal Songs</NAME>
        <ARTIST>Ann Taylor </ARTISTS>
    </CD>
    <CD>
        <NAME>Rock Anthology</NAME>
        <ARTIST>Friends</ARTIST>
    </CD>
</CATALOG>
```

DIFFERENCING AND MERGING TREE-STRUCTURED DOCUMENTS

FIELD OF THE INVENTION

The present invention relates generally to tree-structured documents, such as documents formatted in accordance with the eXtensible Markup Language (XML), and more particularly to determining differences between two such documents and/or merging two such documents.

BACKGROUND OF THE INVENTION

The eXtensible Markup Language (XML) is an emerging standard for the representation and exchange of data, such as data transmitted or received over the Internet. An XML document is a tree-structured, self-descriptive document having a collection of nodes, and that facilitates some form of automatic semantic integration. The XML standard is governed by the World Wide Web Consortium, and is maintained on the Internet at the web site of the World Wide Web Consortium (W3C).

XML documents are sometimes differenced or merged. Differencing two XML documents refers to determining the data that distinguishes one XML document from another XML document. Such data may include data that is found in the former document but not in the latter document, which may be referred to as deletions, as well as data that is found in the latter document but not in the former document, which may be referred to as additions.

By comparison, merging two XML documents adds to a first XML document the data in a second XML document that is not found in the first XML document. Therefore, merging two XML documents is a special case of differencing the XML documents. The data found in the second XML document that is not found in the first XML document during the differencing operation is added to the first XML document in the merging operation.

Prior art approaches for differencing and merging XML documents typically focus on generalized processes that can be employed with any set of XML documents. As such, these approaches may use different heuristics for each different type, or schema, of XML documents, or for each different purpose for which the XML documents are being used. Because of their generalized, heuristic-oriented nature, such prior art approaches may not difference and merge XML documents in the way a user may expect.

For example, an XML document may be different from another XML document based on the layout, or type, of information it contains, and/or based on the actual data, or information, it contains. One type of approach to differencing and merging may use a heuristic that focuses on the layout of information, whereas another type of approach to differencing and merging may use a heuristic that focus on the actual data contained within the layout. Because the user has no control over the type of heuristic a given differencing-and-merging approach employs, the approach may yield results that are undesirable to the user.

More generally, it is difficult to predict whether or not a given generalized and heuristic-oriented approach to XML document differencing and merging will operate as expected by users. As such, developing differencing and merging tools that satisfy user expectations has been problematic. For these and other reasons, there is a need for the present invention.

SUMMARY OF THE INVENTION

The present invention relates to differencing and merging tree-structured documents, such as eXtensible Markup Language (XML) documents. A differencing-and-merging system for tree-structured documents of one embodiment of the invention includes a difference processing unit and a merging processing unit. The differencing processing unit performs a difference operation on at least two tree-structured documents, in accordance with difference configuration information regarding the documents. The merging processing unit performs a merging operation on the tree-structured documents from correspondence information generated by the difference processing unit, based on the difference operation configuration information regarding the documents.

A method of an embodiment of the invention is for determining differences between a first tree-structured document and a second tree-structured document. Each tree-structured document has a number of nodes. The method determines one or more equivalent nodes and one or more ignorable nodes as specified in difference operation configuration information. The equivalent nodes are applied to each document to yield one or more first equivalent nodes for the first document and one or more second equivalent nodes for the second document. The ignorable nodes are applied to each document to yield one or more first ignorable nodes for the first document and one or more second ignorable nodes for the second document.

Furthermore, one or more first sub-trees are generated from the first tree-structured document, with each first equivalent node being a root node of a first sub-tree. Similarly, one or more second sub-trees are generated from the second tree-structured document, with each second equivalent node being a root node of a second sub-tree. Difference processing is performed between each pair of a first sub-tree and a second sub-tree generated from the same equivalent node, where the first and the second ignorable nodes are ignored. This difference processing yields correspondence information indicating the differences between the first and the second documents.

A method of another embodiment of the invention is for merging a first tree-structured document and a second tree-structured document. Each tree-structured document has a number of nodes. The method determines one or more equivalent nodes and one or more ignorable nodes as specified in difference operation configuration information. The equivalent nodes are applied to each document to yield one or more first equivalent nodes for the first document and one or more second equivalent nodes for the second document. The ignorable nodes are applied to each document to yield one or more first ignorable nodes for the first document and one or more second ignorable nodes for the second document.

Furthermore, one or more first sub-trees are generated from the first tree-structured document, with each first equivalent node being a root node of a first sub-tree. Similarly, one or more second sub-trees are generated from the second tree-structured document, with each second equivalent node being a root node of a second sub-tree. Difference processing is performed between each pair of a first sub-tree and a second sub-tree generated from the same equivalent node, where the first and the second ignorable nodes are ignored. This difference processing yields correspondence information indicating the differences between the first and the second documents. The first document and the second document are then merged based on the correspondence information generated that indicates the differences between the documents.

An article of manufacture of an embodiment of the invention includes a computer-readable medium. There is a means in the medium. The means in the medium is for determining differences among at least two tree-structured documents, in accordance with difference operation configuration information regarding the tree-structured documents. Other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram of a differencing-and-merging system for tree-structured documents, according to an embodiment of the invention, and is suggested for printing on the first page of the patent.

FIG. 2A is a diagram of an example tree-structured document, according to an embodiment of the invention.

FIG. 2B is a graphical depiction of the tree-structured document of FIG. 2A, according to an embodiment of the invention.

FIG. 3A is a diagram of another example tree-structured document, according to an embodiment of the invention.

FIG. 4A is a diagram of example difference operation configuration information that can be used for differencing and/or merging the documents of FIGS. 2A and 3A, according to an embodiment of the invention.

FIG. 4B is a diagram of example correspondence information that indicates the differences between the documents of FIGS. 2A and 3A, and that results from differencing these documents, according to an embodiment of the invention.

FIG. 5A is a diagram of an example merged tree-structured document that results from merging the document of FIG. 2A with the correspondence information of FIG. 4B, using the difference operation configuration information of FIG. 4A, according to an embodiment of the invention.

FIG. 5B is a diagram of an example merged tree-structured document that results from merging the document of FIG. 3A with the correspondence information of FIG. 4B, using the difference operation configuration information of FIG. 4A, according to an embodiment of the invention.

FIG. 6 is a diagram of the difference processing unit of the system of FIG. 1 in detail, according to an embodiment of the invention.

FIG. 9 is a diagram providing further explanation of the correspondence information of FIG. 4B, according to an embodiment of the invention.

FIG. 10 is a diagram of difference operation configuration information meta data, according to an embodiment of the invention.

FIG. 11 is a diagram of difference operation configuration information generated from the meta data of FIG. 10, according to an embodiment of the invention.

FIG. 12 is a diagram of example correspondence information between the documents of FIGS. 2A and 3A, according to another embodiment of the invention at least somewhat different than that of FIG. 4B.

FIG. 13 is a diagram of the merged document generated from the documents of FIGS. 2A and 3A, according to another embodiment of the invention at least somewhat different than that of FIGS. 5A and 5B.

DETAILED DESCRIPTION OF THE DRAWINGS

Figure 3B:
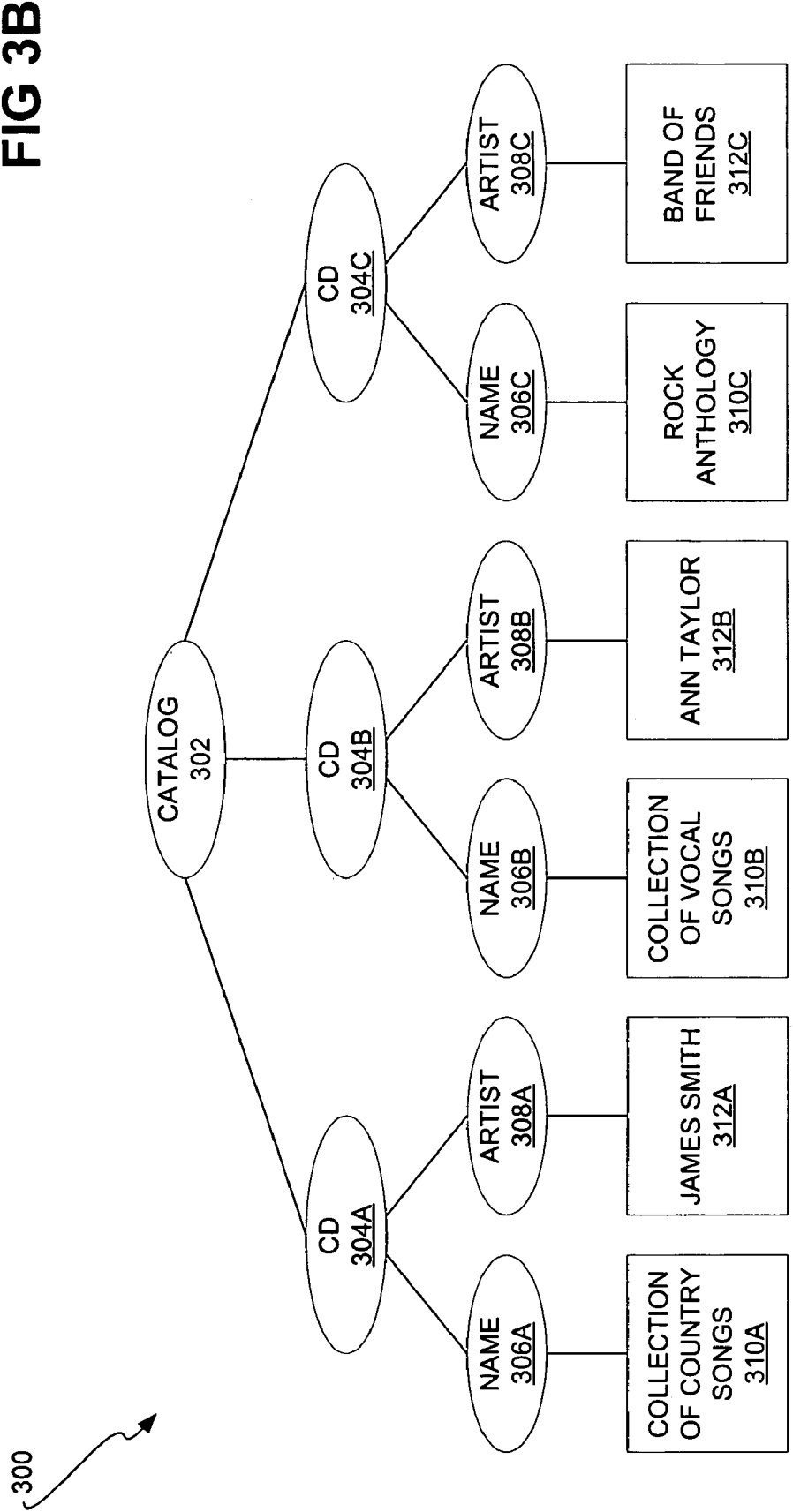
FIG. 3B is a graphical depiction of the tree-structured document of FIG. 3A, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

FIG. 1 shows a differencing-and-merging system 100, according to an embodiment of the invention. The system 100 includes a difference processing unit 102 and a merging processing unit 104. Each of the units 102 and 104 may be implemented in hardware, software, or a combination of hardware and software. For example, where the units 102 and 104 are implemented in software, they may be computer programs, computer subroutines, computer software objects, and other types of computer-executable code or instructions. The system 100 may itself be a computer-implemented system, such as part of a computing device, like a computer, which has one or more processors, memory, storage, and/or other components as known within the art.

The difference processing unit 102 performs a difference operation on a first tree-structured document 106 and a second tree-structured document 108. The documents 106 and 108 may be eXtensible Markup Language (XML)-formatted documents, or other types of tree-structured documents. A difference operation is generally defined as determining the differences between the first-tree structured document 106 and the second tree-structured document 108. The documents 106 and 106 are tree-structured in that that each includes a number of ordered and/or unordered nodes, as described in more detail later in the detailed description.

The difference processing unit 102 performs the difference operation on the documents 106 and 108 based on difference operation configuration information 110 regarding the documents 106 and 108. The configuration information 110 includes the information for determining equivalence of nodes of the documents 106 and 108, as described in more detail later in the detailed description. More precisely, the configuration information 110 includes referential expressions for determining which nodes of the documents 106 and 108 are to be considered equivalent, as well as referential expression for determining which nodes of the documents 106 and 108 are to be ignored, while performing the difference operation. When two nodes are equivalent, there is no difference between the nodes. When nodes are to be ignored, they are not considered when performing the difference operation.

The difference processing unit 102 generates correspondence information 112. The correspondence information 112 indicates the differences between the documents 106 and 108. More specifically, the correspondence information 112 indicates the nodes present in the document 106 that are not present in the document 108, and the nodes present in the document 108 that are not present in the document 106. Such correspondence information 112 is also referred to as difference information.

The merging processing unit 104 performs a merging operation on the documents 106 and 108 from the correspondence information 112 generated by the difference processing unit 102, also based on the configuration information 110 regarding the documents 106 and 108. The result of the merging processing unit 104 is the merged tree-structured document 114. The merged tree-structured document 114 is a merging of the nodes of the first document 106 and the nodes of the second document 108.

For example, the merged tree-structured document 114 may represent all the nodes of the first document 106, and the nodes of the second document 108 that are not found in the first document 106. The merged document 114 may also be considered to represent all of the nodes of the second document 108, and the nodes of the first document 106 that are not found in the second document 108. The configuration operation 110 is employed in the merging operation in one embodiment specifically to determine which nodes are considered equivalent, while performing the merging operation.

The utilization of the difference operation configuration information 110 allows the differencing-and-merging system 100 to be tuned to user expectations, based, for instance, on the types and/or purposes of the tree-structured documents 106 and 108. That is, specifying a priori what nodes or types of nodes within the documents 106 and 108 are to be considered equivalent while performing the difference operation allows the user to guide or affect the difference operation in a desired manner. Similarly, specifying a priori what nodes or types of nodes within the documents 160 and 108 are to be ignored while performing the difference operation and/or the merging operation also allows the user to guide or affect these operations in a desired manner. Thus, ignorable and equivalent nodes can be set for each purpose, use, and/or schema of different documents.

In one embodiment of the invention, the difference operation configuration information 110 is generated by a difference operation configuration information generation unit 116. The generation unit 116 may be software, hardware, or a combination of software and hardware. The generation unit 116 generates the difference operation configuration information 110 from difference operation configuration information meta data 115. The configuration information 110 may, for instance, not be user-readable, but rather may be in computer-readable form, whereas the meta data 115 may be user-readable, as well as user-formulated. Thus, a user may create the meta data 115, which the generation unit 116 translates or converts into the configuration information 110.

Example of Differencing and Merging

Embodiments of the invention are operable on tree-structured documents including a number of ordered and/or unordered nodes. In particular, embodiments of the invention can be implemented in relation to eXtensible Markup Language (XML) documents. XML documents may be represented in accordance with the Document Object Model (DOM) specification, which is available at the World Wide Web Consortium's web site (W3C). The DOM specification provides a way to graphically depict the nodes and data of XML documents.

The manner by which an embodiment of the invention can accomplish differencing and merging is described in relation to two example XML documents. FIGS. 2A and 2B show two example XML documents, according to an embodiment of the invention, whereas FIGS. 3A and 3B show the DOM specification graphical models of these XML documents, according to an embodiment of the invention. In FIG. 2A, the XML document 200 represents a catalog of three records for compact discs (CD's), each having a title field and an artist field. The first CD record has the title field "Collection of Country Songs" and the artist field "James Smith." The second CD record has the title field "Collection of Dance Songs" and the artist field "Frank Jones." The third CD record has the title field "Rock Anthology" and the artist field "Band of Friends."

FIG. 2B shows the DOM specification graphical model of the XML document 200. There are three different types of nodes in a DOM specification graphical model: non-leaf element nodes, leaf attribute nodes, and leaf text nodes. Element nodes are represented in FIG. 2B by ovals, and are non-leaf nodes with a single label, which is the name of the node. The XML document 200 includes a catalog element node 202 and CD element nodes 204A, 204B, and 204C, collectively referred to as the CD element nodes 204.

Attribute nodes are represented in FIG. 2B also by ovals, but they are leaf-nodes have two labels, their name and their values. The XML document 200 includes title attribute nodes 206A, 206B, and 206C, collectively referred to as the title attribute nodes 206, and artist attribute nodes 208A, 208B, and 208C, collectively referred to as the artist attribute nodes 208. Text nodes are represented in FIG. 2B by rectangles, and are leaf nodes with a single label, which is the value of the node. The XML document 200 includes text nodes 210A, 210B, and 210C, collectively referred to as the text nodes 210, and text nodes 212A, 212B, and 212C, collectively referred to as the text nodes 212. The text nodes 210 are the values of the title attribute nodes 206, whereas the text nodes 212 are the values of the artist attribute nodes 208.

In FIG. 3A, the XML document 300 also represents a catalog of three records for CD's, each having a name field and an artist field. It is noted that whereas the XML document 200 has a title field, the XML document 300 has a name field. The first CD record of the XML document 300 has the name field "Collection of Country Songs" and the artist field "James Smith," and thus corresponds to the first CD record of the XML document 200. The second CD record of the XML document 300 has the name field "Collection of Vocal Songs" and the artist field "Ann Taylor," and does not correspond to any CD record of the XML document 200. The third CD record of the XML document 300 has the name field "Rock Anthology" and the artist field "Friends." The third field of the XML document 300 substantially corresponds to the third CD record of the XML document 200, although in the former document the artist field is "Friends" and in the latter document the artist field is "Band of Friends."

FIG. 3B shows the DOM specification graphical model of the XML document 300. The XML document 300 includes a catalog element node 302 and CD element nodes 304A, 304B, and 304C, collectively referred to as the CD element nodes 304. The XML document 300 includes name attribute nodes 306A, 306B, and 306C, collectively referred to as the name attribute nodes 306, and artist attribute nodes 308A, 308B, and 308C, collectively referred to as the artist attribute nodes 308. The XML document 300 includes text nodes 310A, 310B, and 310C, collectively referred to as the text nodes 310, and text nodes 312A, 312B, and 312C, collectively referred to as the text nodes 312. The text nodes 310 are the values of the name attribute nodes 306, whereas the text nodes 312 are the values of the artist attribute nodes 308.

FIG. 4A shows example difference operation configuration information 400, according to an embodiment of the invention, for use in differencing and/or merging the XML documents 200 and 300. For instance, the configuration information 400 may be employed as the information 110 in the system 100 of FIG. 1, where the XML documents 106 and 108 of FIG. 1 are the XML documents 200 and 300, respectively, or are the XML documents 300 and 200, respectively. The configuration information 400 specifically specifies that the title attribute nodes 206 of the XML document 200 are to be considered equivalent to the name attribute nodes 306 of the XML document 300 during differencing and/or merging. That is, the title attribute nodes 206 and the name attribute nodes 306 are equivalent nodes. The configuration information 400 also specifically specifies that the artist attribute nodes 208 and 308 of the XML documents 200 and 300, respectively, are to be ignored during differencing and/or merging. That is, the artist attribute nodes 208 and 308 are ignorable nodes.

FIG. 4B shows example correspondence information 450 that results from differencing the XML documents 200 and 300 using the difference operation configuration information 400, according to an embodiment of the invention. For instance, the correspondence information 450 may be generated as the correspondence information 112 by the difference processing unit 102 of FIG. 1 in differencing the XML documents 106 and 108 using the configuration information 400. The correspondence information 450 indicates that there is one CD record that is only in the XML document 200 (and thus not in the XML document 300), the CD element node 204B. The correspondence information 450 further indicates that there is one CD record that is only in the XML document 300 (and thus not in the XML document 200), the CD record 304B.

It is noted that differencing the XML documents 200 and 300 using the difference operation configuration information 400 treats the title attribute nodes 206 of the XML document 200 as equivalent to the name attribute nodes 306 of the XML document 300. Therefore, the CD element node 204A of the XML document 200 is deemed the same as the CD element node 304A of the XML document 300, and vice-versa, because the values of their attribute nodes 206A and 306A—the text node 210A and 310A—are the same, even though the labels of these attribute nodes 206A and 306A are different. As a result, the CD element nodes 204A and 304B do not appear within the correspondence information 450.

It is further noted that differencing the XML documents 200 and 300 using the difference operation configuration information 400 ignores the artist attribute nodes 208 and 308 of the XML documents 200 and 308. Therefore, the CD element node 204C of the XML document 200 is deemed the same as the CD element node 304C of the XML document 300, and vice-versa, because the values of their attribute nodes 206C and 306C—the text node 210C and 310C—are the same. That is, the fact that the values of the artist attribute nodes 208C and 308C are different—the text node 212C has the value "Band of Friends," whereas the text node 312C has the value "Friends"—does not matter, because the artist attribute nodes 208 and 308 are ignored when determining sameness between the CD element nodes 204 and the CD element nodes 304.

FIG. 5A shows a sample merged XML document 500 that results from merging the XML documents 200 and 300, specifically by adding the correspondence information 450 to the XML document 200, according to an embodiment of the invention. For instance, the merged XML document 500 may be generated as the merged XML document 114 by the merging processing unit 104 of FIG. 1 using the correspondence information 450 and the configuration information 400, where the documents 106 and 108 are the documents 200 and 300, respectively. Specifically, the merged XML document 500 is identical to the XML document 200, but adds the CD element node 304B from the XML document 300, as specified in the correspondence information 450 as the only record that appears in the XML document 300 but not in the XML document 200.

In adding this node 304B to the XML document 200, the configuration information 400 is used to translate the name attribute node 306B of the XML document 300 to a corresponding and equivalent title attribute node in the XML document 500. That is, whereas the CD element node 304B has a name field in the XML document 300, it has a title field in the XML document 500, to be consistent with the CD element nodes 204 of the XML document 200. Furthermore, it is noted that the CD element node 204C retains as its value for the artist attribute node 208C the phrase "Band of Friends" in the merged XML document 500. This is because the phrase "Band of Friends" is the value of the node 212C in the XML document 200, and the merged XML document 500 is generated by merging the differences noted in the correspondence information 450 with the XML document 200 (as opposed to with the XML document 300, which would result in the phrase "Friends" being the value of the node 212C in the merged XML document 500).

FIG. 5B shows a sample merged XML document 550 that results from merging the XML documents 200 and 300, specifically by adding the correspondence information 450 to the XML document 300, according to an embodiment of the invention. For instance, the merged XML document 550 may be generated as the merged XML document by the merging processing unit 104 of FIG. 1 using the correspondence information 450 and the configuration information 400, where the documents 106 and 108 are the documents 300 and 200, respectively. Specifically, the merged XML document 550 is identical to the XML document 300, but adds the CD element node 204B from the XML document 200, as specified by the correspondence information 450 as the only record that appears in the XML document 200 but not in the XML document 300.

In adding this node 204B to the XML document 300, the configuration information 400 is used to translate the title attribute node 206B of the XML document 200 to a corresponding and equivalent name attribute node in the XML document 500. That is, whereas the CD element node 204B has a title field in the XML document 200, it has a name field in the XML document 550, to be consistent with the CD element nodes 304 of the XML document 300. Furthermore, it is noted that the CD element node 304C retains as its value for the artist attribute node 308C the phrase "Friends" in the merged XML document 550. This is because the phrase "Friends" is the value of the node 312C in the XML document 300, and the merged XML document 550 is generated by merging the differences noted in the correspondence information 450 with the XML document 300 (as opposed to with the XML document 200, which would result in the phrase "Band of Friends" being the value of the node 312C in the merged XML document 550).

Particular Implementation of Differencing and Merging Processing Units and Method FIG. 6 shows a particular implementation of the difference processing unit 102, according to an embodiment of the invention. The difference processing unit 102 includes a configuration information analysis unit 602, an application unit 604, a sub-tree generation unit 606, an actual difference processing (sub-) unit 608, and a correspondence generation unit 610. Each of the units 602, 604, 606, 608, and 610 may be implemented in hardware, software, or a combination of hardware and software. For example, where the units 602, 604, 606, 608, and 610 are implemented in software, they may be computer programs, computer subroutines, computer software objects, and other types of computer-executable code or instructions.

The difference operation configuration information 110 is input into the configuration information analysis unit 602. The analysis unit 602 analyzes the difference operation configuration information 10 to yield the equivalent nodes 612 and the ignorable nodes 614 specified in the difference operation configuration information 110. The equivalent nodes 612 and the ignorable nodes 614, as well as the first XML document 106 and the second XML document 108, are input into the application unit 604. The application unit 604 applies the configuration information 110—specifically the equivalent nodes 612 and the ignorable nodes 614 determined therefrom—to the documents 106 and 108, to select nodes among the documents 106 and 108 that are equivalent to one another, as well as to select nodes among the documents 106 and 108 that are to be ignored.

The application unit 604 thus yields a number of first document equivalent nodes 616A (from the first document 106) and a number of second document equivalent nodes 616B (from the second document 108) arranged in pairs, such that one of the nodes 616A is equivalent to one of the nodes 616B, and vice-versa. The equivalent nodes 616A and 616B are collectively referred to as the equivalent nodes 616. The application unit 604 also yields a number of first document ignorable nodes 618A (from the first document 106) and a number of second document ignorable nodes 618B (from the second document 108). The ignorable nodes 618A and 618B are collectively referred to as the ignorable nodes 618.

The equivalent nodes 616 and the ignorable nodes 618 are input into the sub-tree generation unit 606. The sub-tree generation unit 606 divides the first document 106 and the second document 108 into sub-trees based on the difference operation configuration information 110. That is, the sub-tree generation unit 606 generates a number of sub-trees from each of the documents 106 and 108. Specifically, for each of the first equivalent nodes 616A, the unit 606 generates a corresponding sub-tree from the first document 106 in which an equivalent node is the top, or root, node of the sub-tree. Similarly, for each of the second equivalent nodes 616B, the unit 606 generates a corresponding sub-tree from the second document 108 in which an equivalent node is the top node of the sub-tree. In generating the sub-trees from the documents 106 and 108, the unit 606 does not include any of the ignorable nodes 618. Thus, when generating first sub-trees from the first document 106 having the first equivalent nodes 616A as the root nodes, the unit 606 does not include any of the ignorable nodes 618A. Similarly, when generating second sub-trees from the second document 108 having the second equivalent nodes 618A as the root nodes, the unit 606 does not include any of the ignorable nodes 618B.

The sub-tree generation unit 606 outputs the sub-trees to the actual difference processing (sub-) unit 608. The unit 608 may be considered a sub-unit because although it has substantially the same name as the unit 102, it is subsidiary to the unit 102. The unit 608 determines the differences between the first document 106 and the second document 108. The unit 608 specifically determines these differences by comparing each pair of sub-trees generated by the sub-tree generation unit 606 that have equivalent nodes as their root nodes. For example, for the sub-tree generated from the first document 106 that has a selected one of the first equivalent nodes 616A and for the sub-tree generated from the second document 108 that has a selected one of the second equivalent nodes 616B equivalent to the selected one of the first equivalent nodes 616A, the unit 608 determines the differences between these two sub-trees. The manner by which the unit 608 determines differences between a sub-tree generated from the first document 106 and a sub-tree generated from the second document 108, where the two sub-trees have equivalent root nodes, is not limited by the invention. For instance, conventional approaches to determining differences between two sub-trees may be employed by the unit 608, as can be appreciated by those of ordinary skill within the art.

The differences detected by the actual difference processing (sub-) unit 608 are output as a list of nodes for each of the first document 106 and the second document 108 to the correspondence generation unit 610. The correspondence generation unit 610 in turn generates the correspondence information 112 from these lists of nodes. The correspondence information 112 may also be referred to as the correspondences or differences between the documents 106 and 108. It is noted that whereas the difference processing unit 102 has been described in relation to determining the differences as to two documents 106 and 108, it may be implemented in relation to determining the differences among more than two documents.

Figure 7:
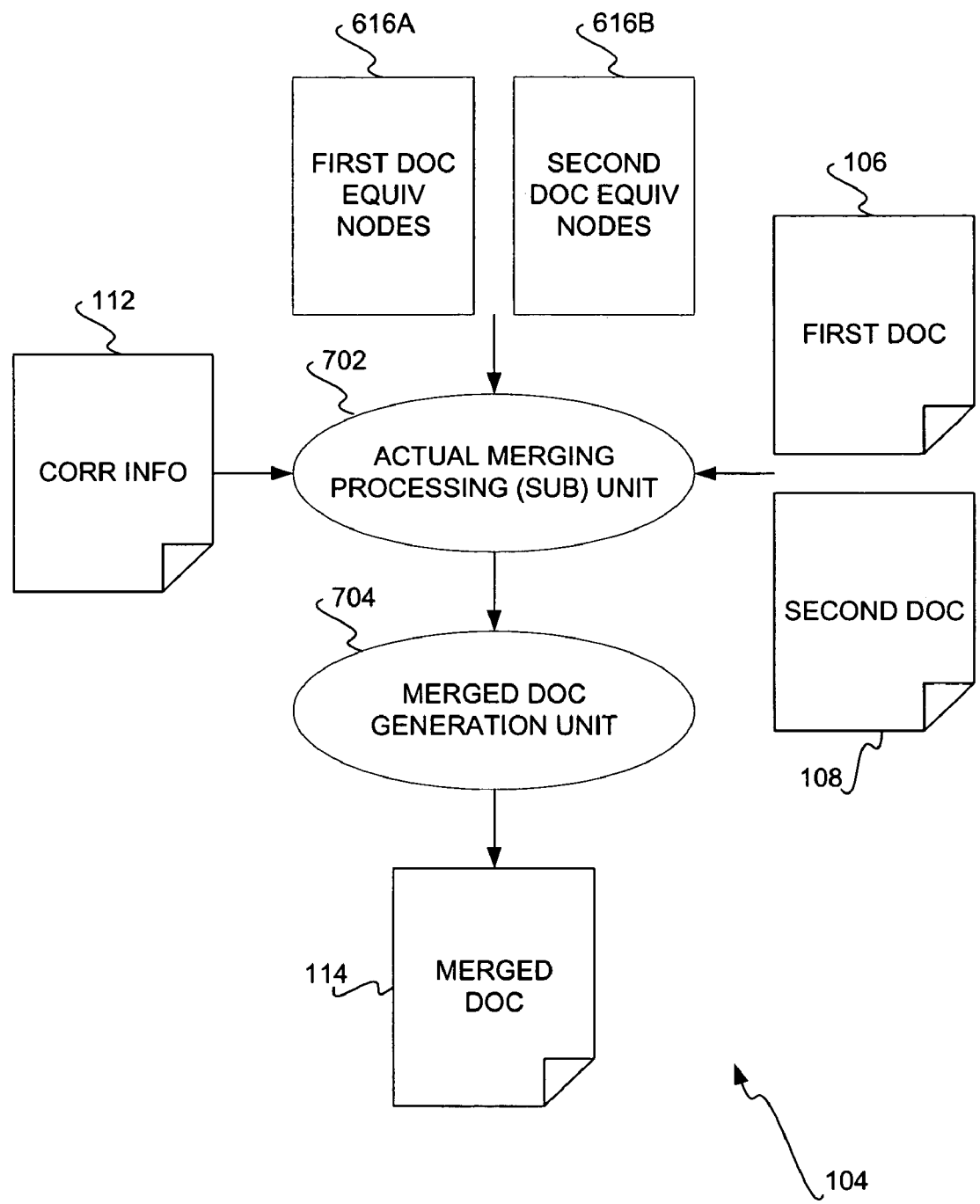
FIG. 7 is a diagram of the merging processing unit of the system of FIG. 1 in detail, according to an embodiment of the invention.

FIG. 7 shows a particular implementation of the merging processing unit 104, according to an embodiment of the invention. The merging processing unit 104 includes an actual merging processing (sub-) unit 702 and a merged document generation unit 704. Each of the units 702 and 704 may be implemented in hardware, software, or a combination of hardware and software. For example, where the units 702 and 704 are implemented in software, they may be computer programs, computer subroutines, computer software objects, and other types of computer-executable code or instructions.

The correspondence information 112, the first document equivalent nodes 616A and/or the second document equivalent nodes 616B, and the first document 106 and/or the second document 108 are all input into the actual merging process (sub-) unit 702. The unit 702 may be considered a sub-unit because although it has substantially the same name as the unit 104, it is subsidiary to the unit 104. The unit 702 adds to the nodes specified in the first document 106 the nodes indicated in the correspondence information 112 that are part of the second document 108 but not part of the first document 106. Alternatively, the unit 702 adds to the nodes specified in the second document 108 the nodes indicated in the correspondence information 112 that are part of the first document 106 but not part of the second document 108. The unit 702 relies upon the equivalent nodes 616 to determine the manner in which the nodes should be denoted when being added.

The actual merging process (sub-) unit 702 outputs these nodes to the merged document generation unit 704. The merged document generation unit 704 then generates the merged document 114 from these nodes. That is, the merged document generation unit 704 generates the merged document 114 based on the merging operation performed by the unit 702. The merged document 114 may be the first document 106 to which the nodes found in the second document 108 but not in the first document 106 are added. Alternatively, the merged document 114 may be the second document 108 to which the nodes found in the first document 106 but not in the second document 108 are added.

Figure 8:
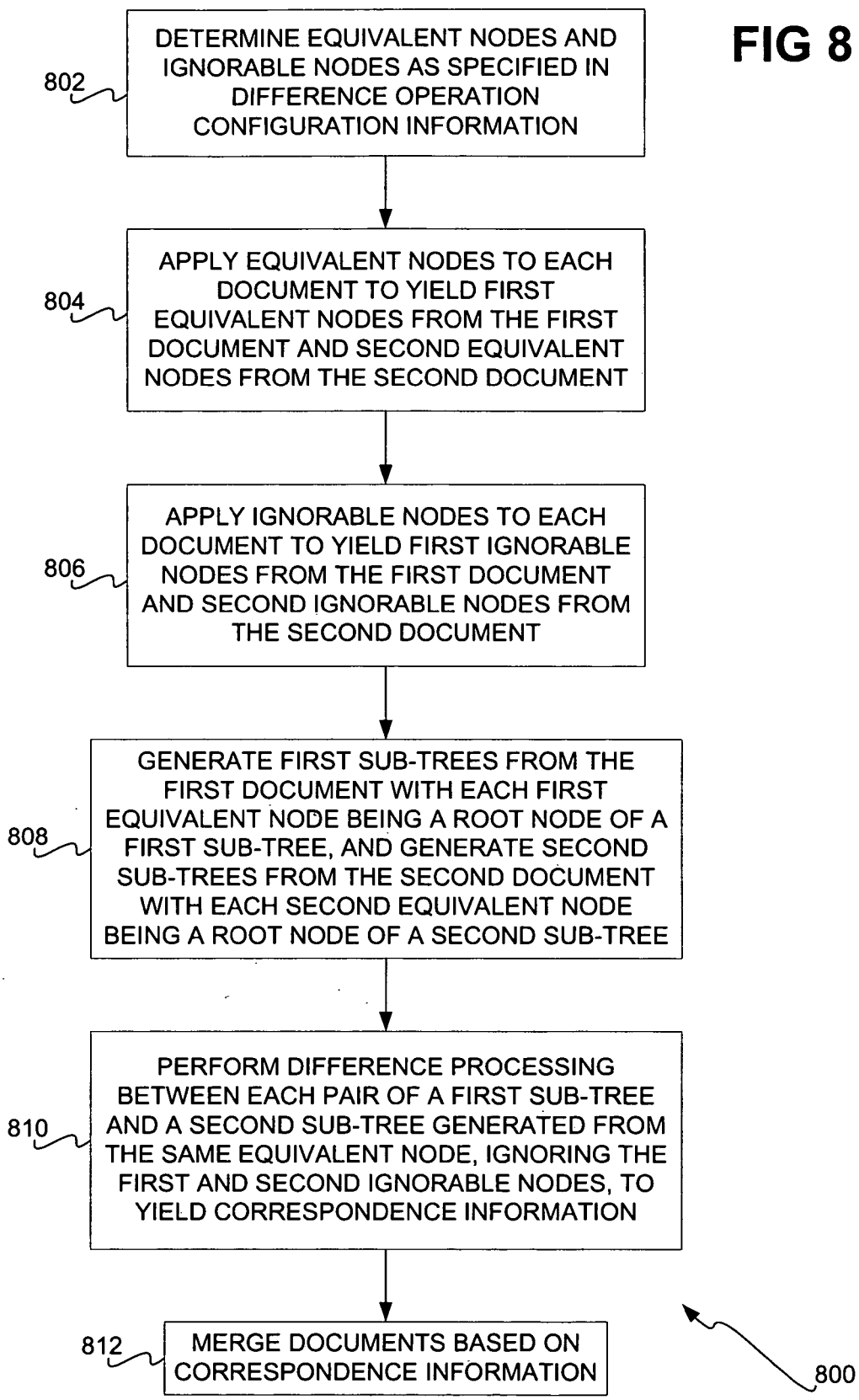
FIG. 8 is a flowchart of a method for differencing and merging two tree-structured documents, according to an embodiment of the invention.

FIG. 8 shows a method 800 for differencing and/or merging two tree-structured documents, according to an embodiment of the invention. The method 800 may be performed in conjunction with the system 100, the various components of which have been described, and is specifically described in relation to the system 100. The method 800 may further be implemented as means within a computer-readable medium of an article of manufacture. The medium may be a recordable data storage medium.

Equivalent nodes 612 and ignorable nodes 614 are determined from the difference operation configuration information 110 (802), such as by the configuration information analysis unit 602. The equivalent nodes 612 are applied to each of the first document 106 and the second document 108, to yield first equivalent nodes 616A from the first document 106 and second equivalent nodes 616B from the second document 108 (804). Similarly, the ignorable nodes 614 are applied to each of the first and the second documents 106 and 108, to yield first ignorable nodes 618A from the first document 106 and second ignorable nodes 618B from the second document 108 (806). 804 and 806 may be performed by the application unit 604.

Next, first sub-trees are generated from the first document 106, with each of the first equivalent nodes 616A being a root node of a first sub-tree, and second sub-trees are generated from the second document 108, with each of the second equivalent nodes 616B being a root node of a second sub-tree (808). 808 may be performed by the sub-tree generation unit 606. Difference processing is then performed between each pair of a first sub-tree and a second sub-tree generated from the same equivalent node of the equivalent nodes 612, where the ignorable nodes 618 are ignored, to yield the correspondence information 112 (810). 810 may thus be performed by the units 608 and 610.

Finally, the documents 106 and 108 are merged based on the correspondence information 112, to yield the merged document 114 (812). For instance, the document 106 may have added thereto nodes present in the document 108 that are not in the document 108, to yield the merged document 114. Alternatively, the document 108 may have added thereto nodes present in the document 106 that are not in the document 106, to yield the merged document 114. 812 may be performed by the units 702 and 704 in one embodiment of the invention.

Further Implementation Information

In this section of the detailed description, further explanation and information is provided for a particular implementation, according to an embodiment of the invention. First, FIG. 9 is a diagram that provides further explanation of the example correspondence information 450 of FIG. 4B, according to an embodiment of the invention. The additional information 900 shows that there is a catalog with an identifier of 1, which is inclusive of three compact discs, or CD's, with identifiers of 2, 7, and 12. The CD identified by 2 further is described by a title having an identifier of 3 and an artist having an identifier of 5. The CD identified by 7 is further described by a title having an identifier of 8 and an artist having an identifier of 10. The CD identified by 12 is further described by a title having an identifier of 13 and an artist having an identifier of 15.

FIG. 10 is a diagram of difference operation configuration information meta data 1000, according to an embodiment of the invention. The equivalent element has a rule element as its child, which describes the condition of equivalence for the CD element. Similarly, the ignorable element has two rule elements as its children, each of which describes a condition for ignoring an element, such as an artist element or a title element.

FIG. 11 is a diagram of difference operation configuration information 1100 that can be generated from the meta data 1000 of FIG. 10, according to an embodiment of the invention. The equivalent element has three xpath elements that contain Xpath expressions pointing to CD elements in the document of FIG. 2A. As one example, the predicate part "descendant:text()[string(.)='Collection of Country Songs']" indicates that the CD element has a text element as its descendant, and that the text has a string having the value 'Collection of Country Songs'. Similarly, the ignorable element has two xpath elements that contain Xpath expressions pointing to elements in the document of FIG. 2A.

FIG. 12 is a diagram of example correspondence information 1200 between the documents of FIGS. 2A and 3A, according to an embodiment of the invention. The node element has an operation for a node designated by an identifier attribute, as found in FIG. 9. In the example of FIG. 12, the operations are composed of four different variations, keep, replace, delete, and insert. The tree-to-tree difference algorithms that may be employed within the prior art may generate the operation keep or replace, for instance, for the node having the identifier 7, while embodiments of the invention generate the operation delete for the node having the identifier 7. Embodiments of the invention further generate the keywords 'Collection of Dance Songs' in the difference operation configuration information of FIG. 11 generated from the meta data of FIG. 10.

Finally, FIG. 13 is a diagram of the merged document generated from the documents of FIGS. 2A and 3A, according to an embodiment of the invention. The merged document is identified by the reference number 1300. The merged document may be generated on the condition that the operation for the node having the identifier 7 in FIG. 11 is not executed.

ADVANTAGES, ALTERNATIVE EMBODIMENTS, AND CONCLUSION

Embodiments of the invention provide for advantages over the prior art. Embodiments of the invention provide for better differencing and merging of tree-structured documents, such as eXtensible Markup Language (XML)-formatted documents. This is because embodiments of the invention rely upon difference operation configuration information, which details equivalent nodes between tree-structured documents and ignorable nodes between documents. Such user-specifiable configuration information allows users to better manage the difference and/or merging process, to yield better and more expected results.

Embodiments of the invention have been described primarily in relation to two XML-formatted documents. However, other embodiments of the invention can be implemented in conjunction with more than two tree-structured documents. Furthermore, other embodiments of the invention can be implemented in conjunction with tree-structured documents other than XML-formatted documents, such as potentially HyperText Markup Language (HTML)-formatted documents, Standard Generalized Markup Language (SGML)-formatted documents, and other types of tree-structured documents.

It is therefore noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

We claim:

1. A method to determine differences between a first tree-structured document and a second tree-structured document, each of the first tree-structured document and the second tree-structure document having a plurality of nodes, the method comprising:
   determining a plurality of equivalent nodes and a plurality of ignorable nodes as specified in difference operation configuration information;
   applying the equivalent nodes to each of the first tree-structured document and the second tree-structure document to yield one or more first equivalent nodes for the first tree-structured document and one or more second equivalent nodes for the second tree-structured document, where the first equivalent nodes and the second equivalent nodes are non-identical nodes;
   applying the ignorable nodes to each of the first tree-structured document and the second tree-structured document to yield one or more first ignorable nodes for the first tree-structured document and one or more second ignorable nodes for the second tree-structured document;
   generating first sub-trees from the first tree-structured document with each of the first equivalent nodes being a root node of one of the first sub-trees, and generating second sub-trees from the second tree-structured document with each of the second equivalent nodes being a root node of one of the second sub-trees; and,
   performing difference processing between each pair of one of the first sub-trees and one of the second sub-trees generated from one of the equivalent nodes specified in the difference operation configuration information, ignoring the first and the second ignorable nodes, to yield correspondence information indicating the differences between the first and the second tree-structured documents, and
   the correspondence information is in eXtensible Markup Language (XML) comprising a list of nodes that are only in one of the first tree-structured document and the second tree-structured document, each node within the list of nodes of the correspondence information specifying in which of the first tree-structured document and the second tree-structured document the node is located.

2. The method of claim 1, wherein each of the first and the second tree-structured documents is an eXtensible markup language (XML)-formatted document comprising:
   at least one non-leaf element node;
   at least one leaf text node, each leaf text node having one label, value; and,
   at least one leaf attribute node, each leaf attribute node having two labels, name and value.

3. A method to merge a first tree-structured document and a second tree-structured document, each of the first tree-structured document and the second tree-structured document having a plurality of nodes, the method comprising:
   determining a plurality of equivalent nodes and a plurality of ignorable nodes as specified in difference operation configuration information;
   applying the equivalent nodes to each of the first tree-structured document and the second tree-structure document to yield one or more first equivalent nodes for the first tree-structured document and one or more second equivalent nodes for the second tree-structured document, where equivalent nodes are non-identical nodes;
   applying the ignorable nodes to each of the first tree-structured document and the second tree-structure document to yield one or more first ignorable nodes for the first tree-structured document and one or more second ignorable nodes for the second tree-structured document;
   generating one or more first sub-trees from the first tree-structured document with each of the first equivalent nodes being a root node of a first sub-tree, and generating one or more second sub-trees from the second tree-structured document with each of the second equivalent nodes being a root node of a second sub-tree;
   performing difference processing between each pair of one of the first sub-trees and one of the second sub-trees generated from one of the equivalent nodes specified in the difference operation configuration information, ignoring the first and the second ignorable nodes, to yield correspondence information indicating differences between the first and the second tree-structured documents, the correspondence information is in eXtensible Markup Language (XML) comprising a list of nodes that are only in one of the first tree-structured document and the second tree-structured document, each node within the list of nodes of the correspondence information specifying in which of the first tree-structured document and the second tree-structured document the node is located; and,
   merging the first tree-structured document and the second tree-structured document based on the correspondence information indicating the differences between the first and the second tree-structured documents.

4. The method of claim 1, wherein each of the first and the second tree-structured documents is an eXtensible markup language (XML)-formatted document comprising:
   at least one non-leaf element node;
   at least one leaf text node, each leaf text node having one label, value; and,
   at least one leaf attribute node, each leaf attribute node having two labels, name and value.

* * * * *